May 26, 1925.
W. S. PALMER
FILLER FOR EGG SHIPPING CASES AND THE LIKE
Filed Feb. 7, 1923
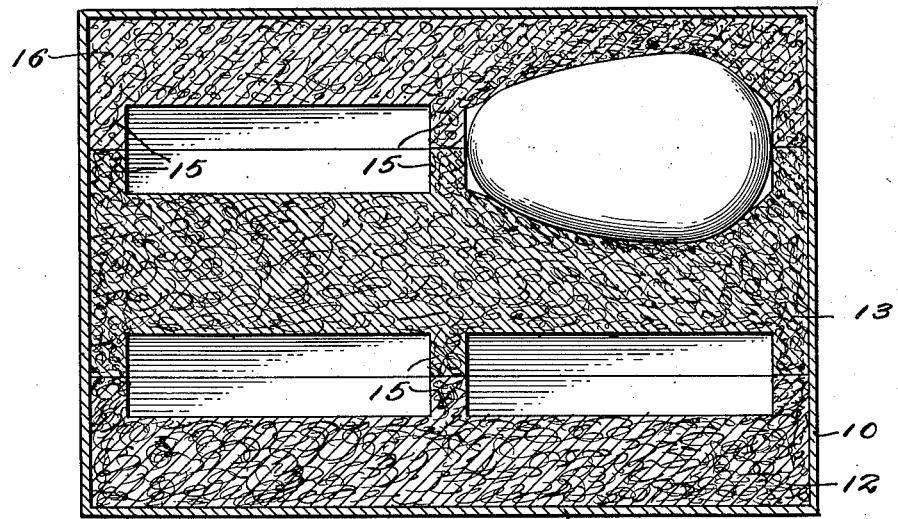
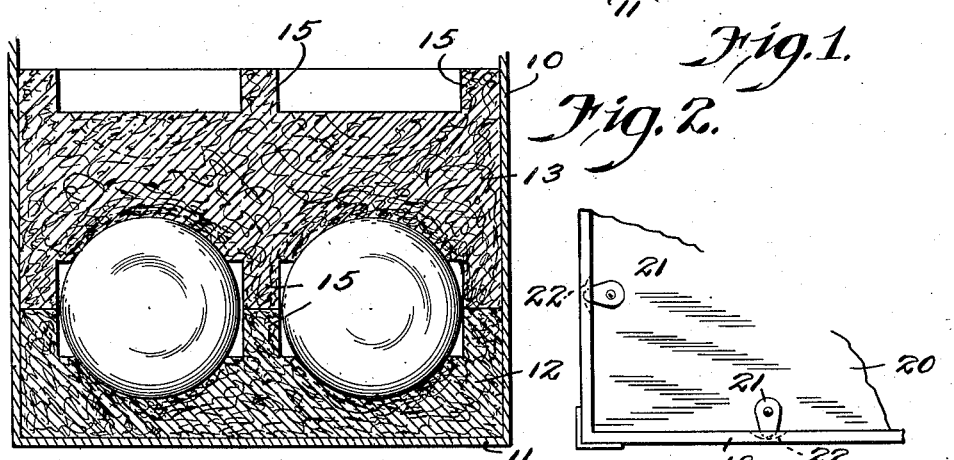
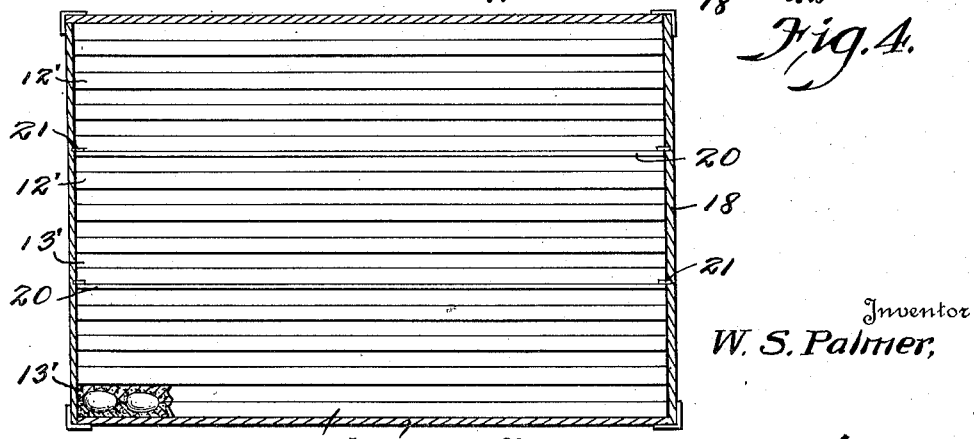
Inventor
W. S. Palmer,
By H. L. Woodward
Attorney Patented May 26, 1925.

1,539,140

UNITED STATES PATENT OFFICE.

WINFIELD S. PALMER, OF GLENBURN, PENNSYLVANIA.

FILLER FOR EGG-SHIPPING CASES AND THE LIKE.

Application filed February 7, 1923. Serial No. 617,567.

*To all whom it may concern:*

Be it known that I, WINFIELD S. PALMER, a citizen of the United States, residing at Glenburn, in the county of Lackawanna and State of Pennsylvania, have invented certain new and useful Improvements in Fillers for Egg-Shipping Cases and the like, of which the following is a specification.

This invention relates to fillers for use in shipping cases for eggs and the like, and has for an object to provide an efficient and light means to prevent breakage of the articles contained therein. Another object of the invention is to provide a filler of resilient material having separate compartments for each egg or article to be contained within the receptacle.

Another object of the invention is to provide a filler device, which when used in conjunction with a case, may be readily adapted for shipments by parcel post, as well as for shipments by freight or express in large quantities.

It is the experience of commission houses and the postal authorities that much breakage occurs, notwithstanding the care taken to safeguard the shipments with devices now available. All shipments to commission houses are repacked in order to cull the "cracks". The liability of damage is especially objectionable, and ordinary egg packing devices are particularly unsatisfactory in the main, when shipments of settings are to be made. These are valued on the average at several times as much as the best eggs for food, often selling at twenty-five dollars for fifteen eggs, and in exceptional instances at much higher figures. Eggs for setting may be damaged without having their shells broken by strain of the yoke envelope, or other effects such as severe concussion which might affect the vitality of the resulting chick.

It is therefore an aim of my invention not only to lessen the breakage of eggs but to provide for the support of the eggs in such manner that they will not be severely jarred by sharp concussions or shocks to the egg case.

Another important aim is to provide a filler element which may be readily cut to suit various sizes of containers, without detracting from the efficiency of the device.

Additional objects, advantages and features of invention may be apparent from the following description and from the drawings wherein, Figure 1 is a cross sectional view of a container with my filler elements therein, Fig. 2 is a fragmentary cross sectional view, Fig. 3 is a longitudinal sectional view of an egg case, as used when making large shipments, Fig. 4 is a detail top plan view of a supporting element.

There is illustrated a case 10, which may be of any approved size, shape and construction, including a bottom 11, upon which a filler base 12 is shown, and superposed thereabove a filler 13 is provided. The filler elements are preferably of two forms, the one 12 as a top or bottom member, and the other 13 to be interposed therebetween, although all may be of the first order, if desired. They comprise a body of sponge rubber as heretofore produced (other materials may be employed, as felt and other resilient material), which is preferably moulded with recesses on one side in the case of the filler 12, and on both sides in the filler 13, these recesses being of such size that when the recessed sides of two fillers are opposed and snugly abutting, chambers or compartments are formed each of a size slightly smaller than an egg in one direction—vertically herein. It has been found desirable to make these recesses of oblong rectangular form, as tending to permit more ready adjustment of eggs therein rapidly and to minimize possible binding of the sides of the recesses upon eggs and free access of air. In this way, rectilinear ribs or partitions 15 are formed joined integrally at their intersections, and extending at right angles to each other. The filler 13 is formed with a similar number of compartments and of the same dimensions so that when placed over the first named filler element, one recess will aline with another and a complete enclosure formed. The filler element 13 of Figs. 1 and 2 is formed with compartments or recesses on both sides, and in this manner any number of tiers may be built up. When the desired number of compartments have been formed, with eggs therein and it is desired to seal or close the container, a top element 16 may be placed over the last element 13 and secured. Thus, it will be seen that each egg is held firmly in each respective compartment and liability of breakage of the egg avoided. The filler elements are formed in the present instance, of a soft and pliable rubber material (sponge rubber), although other substance of desirable characteristics may be employed. These filler elements may be produced by any approved method, but in the present instance, it is contemplated to mold them.

The recesses are so shaped that the packed eggs will lie with their major axes extending horizontally,—that is parallel to the planes of the bottom and top of the case. The width and length of the recesses and the thickness of the partitions are such that the ends and sides of the eggs will very lightly engage the partitions. This is purposed to attain a special effect. That is, it limits the area of the cushion material which is normally compressed by the egg, so that there may be a greater extent of movement in the absorption of shocks to the case. This arrangement is of especial value when it is appreciated that the severest shocks to which crates and packages are subjected rarely involve a resultant at right angles to the plane of the bottom of the case. If a case is dropped one end or corner will strike the floor or an obstruction first, or if in setting a crate down, one end is dropped after the first rests upon the floor, the movement is pivotal and the shock imparted is the result of forces acting at a tangent to the arc in which the elements of the package move. This will involve movements in the egg contents laterally or longitudinally, and as may be perceived from an inspection of Figs. 1 and 2, this lateral shaking will not be abruptly imparted, nor abruptly checked, as a result of the structure set forth.

While the filler elements may be formed of a size to fit properly in standard containers, the filler elements may, if necessary, be cut to fit containers other than standard, without detracting from the supporting and cushioning effect, as each compartment is self-sustaining, through the ribs and end walls.

In Figures 3 and 4, I have illustrated the use of my filler elements in use with an ordinary egg case or crate, largely used by shippers and commission merchants. In this instance, the numeral 18 represents the case, having a bottom 19, and as in the previous instance, the base filler 12' is shown with a top filler element 13' superposed thereabove, and eggs interposed therebetween. The filler elements in this case, are all formed alike, the cavities or chambers being formed on one side of the elements only, although if desired, these elements may be formed as first described. In order to prevent excessive weight or downward pressure upon the lower layers of eggs, a sub-floor or tray 20 may be arranged between a suitable number of layers, whereby the weight of any eggs packed thereabove will not fall upon those first placed in the case. The trays 20 may be supported by means of key devices 21, which may be pivotally mounted, and arranged to swing into slots 22 formed in the sides of the case, see Fig. 4.

What is claimed:—

1. As an improved article of manufacture, a body of sponge rubber or the like having regularly spaced recesses formed in a face thereof and adapted, when two such faces are opposed to form chambers slightly smaller than an egg, whereby eggs packed individually in the chambers will be cushioned and preserved from abrupt movements.

2. In a filler and packing for egg cases, a body of resilient and elastic material having a plurality of recesses therein, and a second body of similar material opposed to the first to abut the same snugly, the partitions between the said recesses being of an aggregate height less than the diameter of an egg.

3. The article of claim 2 in which the width and length of said recesses corresponds to the diameter and length of an egg for loose fit of an egg therebetween.

In testimony whereof I have affixed my signature.

WINFIELD S. PALMER.